(12) United States Patent
Eliasson et al.

(10) Patent No.: US 6,925,993 B1
(45) Date of Patent: Aug. 9, 2005

(54) APPARATUS FOR CLEANING OF CRANKCASE GAS

(75) Inventors: Thomas Eliasson, Huddinge (SE); Leif Bengtsson, Huddinge (SE); Ingvar Hällgren, Tumba (SE); Stefan Szepessy, Huddinge (SE); Jan Skoog, Skogås (SE)

(73) Assignee: Alfa Laval Corporate AB, Lund (SE)

( * ) Notice: Subject to any disclaimer, the term of this patent is extended or adjusted under 35 U.S.C. 154(b) by 0 days.

(21) Appl. No.: 10/824,682

(22) Filed: Apr. 15, 2004

(51) Int. Cl.[7] ............................................. F01M 13/04
(52) U.S. Cl. ..................................................... 123/572
(58) Field of Search ............................... 123/572–574, 123/41.86

(56) References Cited

U.S. PATENT DOCUMENTS

| | | | |
|---|---|---|---|
| 5,954,035 A | * | 9/1999 | Hofer et al. .................. 123/573 |
| 6,152,120 A | * | 11/2000 | Julazadeh ..................... 123/572 |
| 6,783,571 B2 | * | 8/2004 | Ekeroth ............................ 95/8 |

* cited by examiner

Primary Examiner—Marguerite McMahon
(74) Attorney, Agent, or Firm—Michaud-Duffy Group LLP

(57) ABSTRACT

An apparatus for cleaning of crankcase gas coming from an internal combustion engine can be carried by and be releasably coupled to the combustion engine. For this purpose the apparatus comprises an adapter element, which can be connected with the combustion engine, and a housing, which can be releasably coupled to the adapter element and which delimits a separation chamber. The housing supports in the separation chamber a centrifugal rotor that is rotatable about a vertical rotational axis and is arranged for cleaning of the crankcase gas. The centrifugal rotor has a drive shaft extending downwards through a bottom in the separation chamber and into a drive chamber, in which the drive shaft carries a turbine wheel. A nozzle is arranged to spray pressurized lubricating oil against the turbine wheel for rotation thereof and of the centrifugal rotor. The adapter element is intended to abut against the combustion engine by means of an abutment surface, which has a first opening for receiving pressurized lubricating oil from the combustion engine and a second opening for returning to the combustion engine from the drive chamber lubricating oil having been used for driving of the centrifugal rotor. Said first opening communicates through a channel in the adapter element with the nozzle and said second opening communicates through an outlet channel in the adapter element with the drive chamber.

4 Claims, 2 Drawing Sheets

APPARATUS FOR CLEANING OF CRANKCASE GAS

CROSS-REFERENCE TO RELATED APPLICATIONS

This application is entitled to the benefit of and incorporates by reference essential subject matter disclosed in Swedish Patent Application No. 0400790-2 filed on Mar. 25, 2004.

FIELD OF THE INVENTION

The present invention relates to an apparatus for cleaning of crankcase gas coming from an internal combustion engine, said apparatus comprising
- a housing delimiting a separation chamber,
- a centrifugal rotor that is arranged for cleaning of said crankcase gas, is rotatable about a substantially vertical rotational axis and is supported by the housing in the separation chamber,
- a drive shaft for rotation of the centrifugal rotor, said drive shaft extending downwardly from the centrifugal rotor through a bottom in the separation chamber and into a drive chamber situated below said bottom,
- a turbine wheel carried by said drive shaft in the drive chamber and
- a nozzle that is arranged to receive pressurised lubricating oil from the combustion engine and to direct the oil towards the turbine wheel for rotation thereof and, thereby, of the centrifugal rotor.

BACKGROUND OF THE INVENTION

An apparatus of this kind is known from WO 01/00969.

An apparatus for cleaning of crankcase gas from an internal combustion engine must be compact and inexpensive and must also be easy to mount near the combustion engine. Furthermore, it preferably has a design such that it can be easily mounted in the same manner in connection with engines of different kinds and sizes. This necessitates that the apparatus is provided with, among other things, suitable devices for supply of pressurised lubricating oil from the combustion engine for driving of the aforementioned turbine and also for returning such lubricating oil from the apparatus back to the combustion engine.

The object of the present invention is to provide an apparatus of the kind here in question, which fulfils the requirements just mentioned.

SUMMARY OF THE INVENTION

This object may be obtained according to the invention by a cleaning apparatus of the initially defined kind, wherein
- the apparatus also comprises an adapter element that is formed such that it is mountable onto the combustion engine and arranged to be coupled releasably to said housing,
- an abutment surface on the adapter element is arranged to abut against a corresponding abutment surface on the combustion engine and has a drive oil opening that is formed and placed to receive pressurised lubricating oil from a supply opening in the abutment surface of the combustion engine and a return oil opening that is formed and placed to return to a receiving opening in the abutment surface of the combustion engine lubricating oil having been used for driving said turbine wheel, and
- the adapter element delimits a drive oil passage, that connects the drive oil opening with said nozzle, and a return oil passage connecting said drive chamber with the return oil opening.

According to the invention the adapter element may be formed in different ways to suit different types of combustion engines but, still, be formed to suit a housing of a single kind comprising a centrifugal rotor of a standard design. Preferably, the abutment surface of the adapter element is facing substantially perpendicularly to the rotational axis of the centrifugal rotor, since surfaces on a combustion engine, available as abutment surfaces for a cleaning apparatus of the kind here in question, often extend vertically.

In the cleaning apparatus according to the invention said nozzle may be carried by either the adapter element or said housing. In the latter case the drive oil passage in the adapter element may open in a way such that, upon coupling of the adapter element and the housing together, the drive oil passage is connected directly to a channel in the nozzle or to a channel extending though part of the housing and leading to the nozzle. Special coupling means may be formed in the adapter element and the housing for automatically providing said connection, when the housing is applied onto the adapter element to be coupled together therewith.

It can be an advantage that the nozzle for the drive oil is not carried by the adapter element but by the housing, since the housing is also carrying the turbine wheel. This creates good conditions, namely, for an arrangement of the nozzle in an exactly correct position in relation to the turbine wheel, even if the adapter element is manufactured separately and is mounted onto the combustion engine before the housing with the centrifugal rotor is mounted.

BRIEF DESCRIPTION OF THE DRAWINGS

The invention is described in the following with reference to the accompanying drawing.

DETAILED DESCRIPTION OF THE PREFERRED EMBODIMENTS

Figure 1:
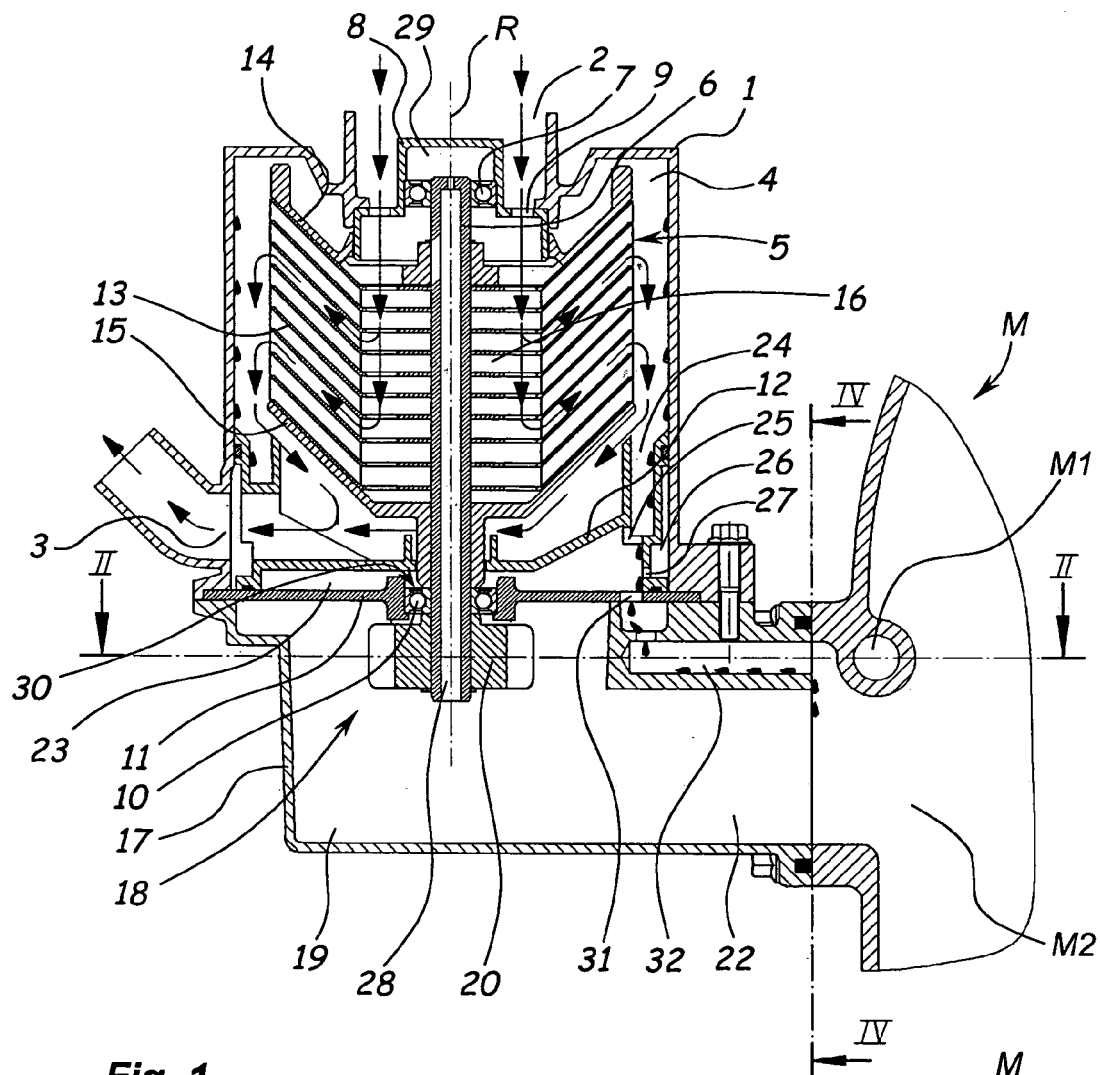
FIG. 1 shows in section a cleaning apparatus according to the invention, mounted on an internal combustion engine.

The apparatus in the drawing has a housing 1 provided with an inlet 2 at the top for incoming gas to be cleaned and an outlet 3 on one of its sides for gas having been cleaned. The outlet 3, as shown, may be connected to an outlet conduit extending upwards or obliquely upwards outside the housing 1. Within the housing 1 a separation chamber 4 is delimited, and in this chamber a centrifugal rotor 5 is arranged to rotate about a vertical rotational axis R.

The centrifugal rotor 5 has a central, vertical, hollow shaft 6, which at its upper end is journalled by a ball bearing 7 in a cap 8, which is supported by the upper part of the housing 1. Several through going holes 9 in the cap 8 connect the inlet 2 of the housing with a central part of the centrifugal rotor interior. At its lower end the shaft 6 is journalled by means of a ball bearing 10 in a lower partition 11, which is connected with the housing 1. An upper partition 12 situated between the lower partition 11 and the centrifugal rotor 5 is also connected with the housing 1 and forms together with the lower partition 11 a bottom in the separation chamber 4.

The centrifugal rotor 5 also comprises a stack of frusto-conical separation discs 13 supported by the shaft 6. The stack of separation discs 13 is arranged axially between an upper end disc 14 and a lower end disc 15. Between the separation discs there are spacing members of a conventional kind for the formation of flow paths between adjacent separation discs for the gas to be cleaned. As can be seen in the drawing, each separation disc 13 has a central plane portion having a hole for the shaft 6 and several further holes distributed around the shaft 6. The further holes in the separation disc 13 and the interspaces between the central, plane portions of the separation discs 13 form together a central inlet chamber 16 in the centrifugal rotor, which communicates through the holes 9 in the cap 8 with the housing inlet 2 for gas to be cleaned and also communicates through the flow paths between the separation discs 13 with the part of the separation chamber 4 surrounding the centrifugal rotor 5. This part of the separation chamber communicates in turn with the housing outlet 3 for gas having been cleaned.

The housing 1 rests on and is releasably coupled to an adapter element 17 by means of screws (only one screw is shown in FIG. 1), the adapter element surrounding a driving device 18 for the centrifugal rotor 5. As shown in the drawing, the adapter element 17 and the aforementioned lower partition 11 delimit a drive chamber 19. The centrifugal rotor shaft 6, which extends through the whole of the housing 1 and through the two partitions 11 and 12 down into the drive chamber 19, supports a turbine wheel 20 in the latter.

Figure 2:
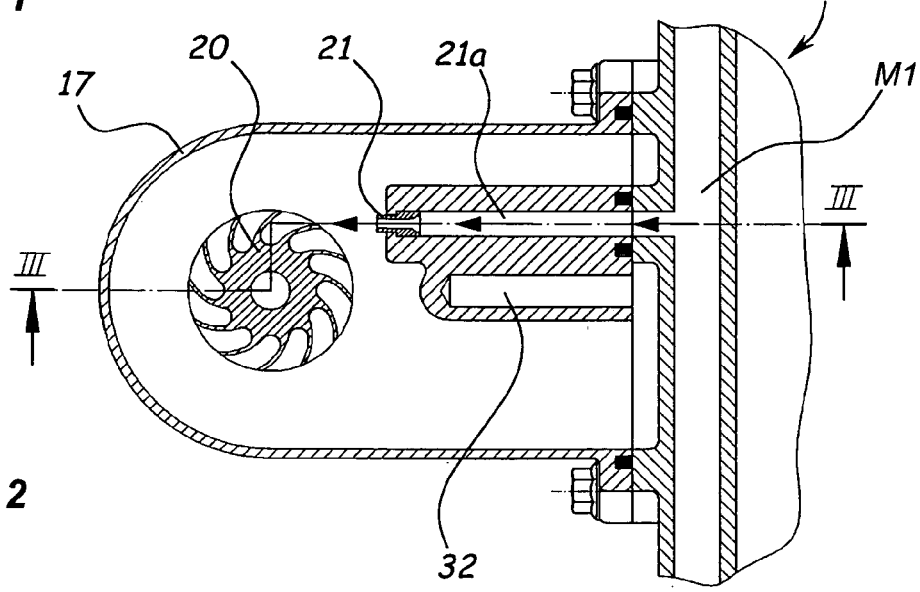
FIG. 2 shows a section of a part of the cleaning apparatus along the line II—II in FIG. 1.
Figure 3:
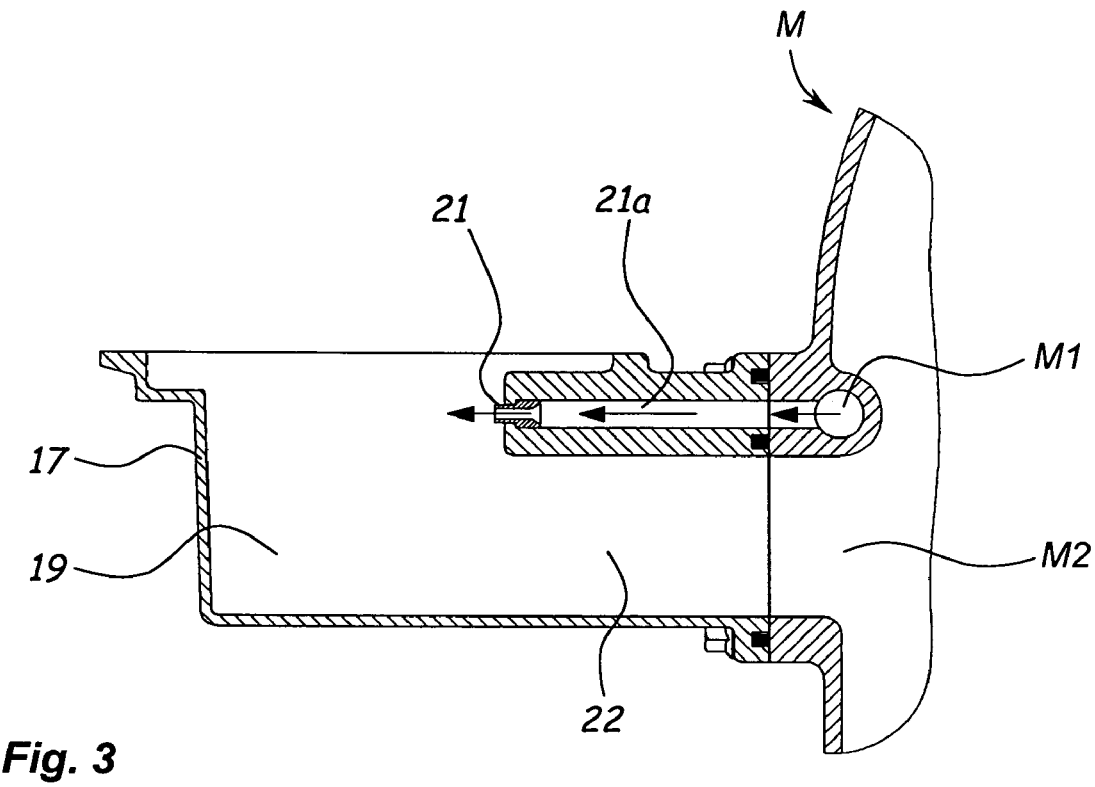
FIG. 3 shows a section of a part of the cleaning apparatus along the line III—III in FIG. 2.

A nozzle 21, which is supported by the adapter element 17 (FIG. 2), is arranged to direct a jet of pressurized lubricating oil towards the turbine wheel 20 for rotation thereof and, thereby, of the centrifugal rotor 5. The nozzle 21 is connected to a passage 21a formed in the adapter element 17 for receiving pressurized lubricating oil. An outlet channel 22 (FIG. 1) extends away from the drive chamber 19 and is intended for leading away lubricating oil having been used for driving of the centrifugal rotor 5.

Figure 4:
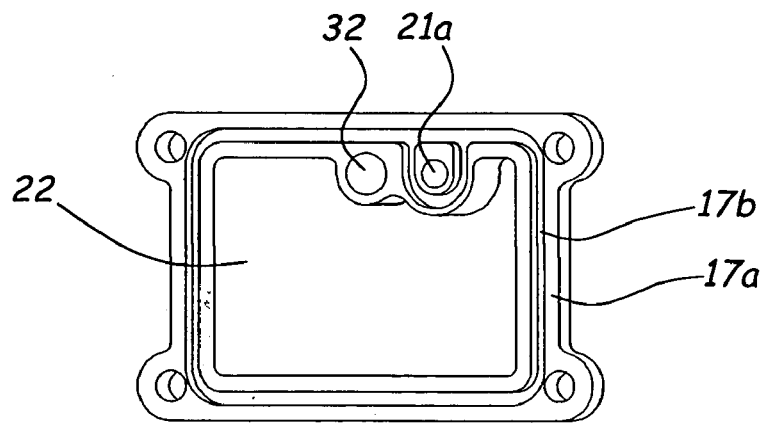
FIG. 4 shows a section along the line IV—IV in FIG. 1, illustrating an abutment surface of a part of the cleaning apparatus, which is intended to get into abutment against the combustion engine.

The adapter element 17 is supported by and is releasably connected by means of screws with an internal combustion engine M that is illustrated schematically and partly in section. The adapter element 17 has an abutment surface 17a (FIG. 4) having a relatively small first opening in communication with the passage 21a and a relatively large second opening in communication with the outlet channel 22. The abutment surface also has a groove 17b intended for a gasket (not shown). The engine M has a corresponding abutment surface with two corresponding openings intended to be placed opposite to the passage 21a and the outlet channel 22, respectively.

As illustrated in the drawing, the engine M has a channel M1 for pressurized lubricating oil, which channel communicates with the passage 21a. If desired, a closing valve (not shown) may be arranged in the passage 21a or in a passage between the engine channel M1 and the passage 21a. A space M2 in the engine M communicates both with the outlet channel 22 in the adapter element 17 and with the interior of the crankcase of the engine M (not shown).

The aforementioned partitions 11 and 12 delimit between themselves a space 23, which extends about the centrifugal rotor shaft 6 and which in the following will be named "drainage chamber". The main object of this drainage chamber 23 is to prevent driving liquid in the drive chamber 19 from being unintentionally pressed upwardly to the separation chamber 4. The drainage chamber 23 is also used to receive, and to forward to an outlet, liquid having been separated in the separation chamber 4 from gas supplied thereto. It is also used for a further object, which shall be explained later.

For receiving liquid separated from the gas in the separation chamber 4 the upper partition 12 forms an annular groove 24 that extends around the lower part of the surrounding wall of the housing 1. At least one outlet 25 at the bottom of the groove leads to the drainage chamber 23. Around the groove 24, between this and the surrounding wall of the housing 1, an annular space 26 is delimited, communicating with the outlet 3 of the housing 1 for cleaned gas. From this space 26 at least one further outlet 27 leads to the drainage chamber 23.

The centrifugal rotor shaft 6 has an axially through going channel 28 that can conduct a mist of liquid from the drive chamber 19 to a small chamber 29 delimited within the cap 8 above the shaft 6. Mist of this kind is used for lubrication of the upper bearing 7. For limiting the amount of mist that may flow to the bearing 7 the shaft 6 supports at its upper part a disc or the like, forming a throttle of the channel 28. Mist having entered the chamber 29 flows further through the bearing 7 into the centrifugal rotor and is mixed therein with entering gas to be cleaned.

The lower bearing 10 is of a kind having on its upper side an annular cover dish 30 arranged to bridge the distance between the outer non-rotatable bearing ring and the inner rotatable bearing ring of the bearing. The cover dish 30 prevents a free flow of liquid mist from the drive chamber 19 into the drainage chamber 23 but cannot completely prevent such a flow, particularly after sometime of wear.

The drainage chamber 23 has at least one liquid outlet 31, which opens into a channel 32 formed in the adapter element 17. The channel 32 in turn opens in the abutment surface of the adapter element (FIG. 4), through which the adapter element abuts against the engine M. Alternatively, the channel 32 may open into the aforementioned outlet channel 22 in the adapter element 17, which conducts lubricating oil out of the drive chamber 19.

The cleaning device shown in the drawing operates in the following way in connection with cleaning of crankcase gas coming from the internal combustion engine M, the crankcase of which (not shown) is connected to the inlet 2 of the apparatus at the upper part of the housing 1.

When lubricating oil is sprayed at a high pressure through the nozzle 21 against the turbine wheel 20, so that this is caused to rotate about the rotational axis R, an oil mist is generated in the drive chamber 19 and oil splashes in all directions therein. Upon the resulting rotation of the centrifugal rotor 5 gas therein is caused to rotate, thereby being pumped outwardly through the flow paths between the separation discs 13. Thereby a partial vacuum will come up in the central inlet chamber 16 of the centrifugal rotor, whereby crankcase gas is sucked in to the rotor and is forced to flow through the centrifugal rotor under rotation. The crankcase gas contains suspended particles in the form of oil and soot particles, and in the flow paths between the separation discs 13 these particles are separated from the gas by action of the centrifugal force. While the crankcase gas is pumped out into the separation chamber 4 around the centrifugal rotor and further out through the gas outlet 3 of the housing, the particles deposit on the upwardly facing sides of the separation discs 13, on which they move further (slide or run) radially outwardly and are finally thrown away from the separation discs towards the surrounding wall of the housing 1. Separated oil (with particles suspended therein) runs along said surrounding wall down into the groove 24 and further through the outlet 25 therefrom into the drainage chamber 23. From the drainage chamber 23 the oil runs further out through the outlet 31 to the channel 32 and from there back to the crankcase of the combustion engine.

After some time of operation it may happen, if the cleaned crankcase gas leaving the housing 1 through the outlet 3 has not been 100% free of oil mist, that some drop of oil now and then runs back from the outlet conduit into the lower part of the separation chamber 4. Such oil enters the annular space 26, from where its runs further through the outlet 27 into the drainage chamber 23 and from there further out thereof through the outlet 31. The outlet 27 from the space 26 can also be regarded as a throttle inlet to the drainage chamber 23, and an inlet of this kind may alternatively be situated so that oil may run directly from said outlet conduit to the drainage chamber without passing through the lower part of the separation chamber 4.

Oil that is sprayed in the drive chamber 19 against the turbine wheel 20 and splashes towards the bearing 10 may partly pass through the bearing and up into the drainage chamber 23. Here oil of this kind runs by itself to the outlet 31 and is returned therethrough and through the channels 32 and 22 to the crankcase of the combustion engine.

What is claimed is:

1. An apparatus for cleaning of crankcase gas coming from an internal combustion engine, said apparatus comprising
    a housing delimiting a separation chamber,
    a centrifugal rotor that is arranged for cleaning of said crankcase gas, is rotatable about a substantially vertical rotational axis and is supported by the housing in the separation chamber,
    a drive shaft for rotation of the centrifugal rotor, said drive shaft extending downwardly from the centrifugal rotor through a bottom in the separation chamber and into a drive chamber situated below said bottom,
    a turbine wheel carried by said drive shaft in the drive chamber and
    a nozzle that is arranged to receive pressurised lubricating oil from the combustion engine and to direct the oil towards the turbine wheel for rotation thereof and, thereby, of the centrifugal rotor, wherein
    the apparatus also comprises an adapter element that is formed such that it is mountable onto the combustion engine and arranged to be coupled releasably to said housing,
    an abutment surface on the adapter element is arranged to abut against a corresponding abutment surface on the combustion engine and has a drive oil opening that is formed and placed to receive pressurised lubricating oil from a supply opening in the abutment surface of the combustion engine and a return oil opening that is formed and placed to return to a receiving opening in the abutment surface of the combustion engine lubricating oil having been used for driving said turbine wheel, and
    the adapter element delimits a drive oil passage, that connects the drive oil opening with said nozzle, and a return oil passage connecting said drive chamber with the return oil opening.

2. An apparatus according to claim 1, wherein the drive chamber is delimited by said bottom as well as the adapter element.

3. An apparatus according to claim 1, wherein the adapter element is formed with a channel, one end of which forms an opening in said abutment surface of the adapter element and the opposite end of which communicates with a channel through said housing, which communicates with the separation chamber in the housing for receiving oil having been separated from crankcase gas.

4. An apparatus according to claim 1, wherein the abutment surface of the adapter element is facing perpendicularly to the rotational axis of the centrifugal rotor.

* * * * *